(No Model.) 5 Sheets—Sheet 1.

W. HENDLEY.
VENTILATING CONDUITS FOR ELECTRIC WIRES AND ADJUSTING THE WIRES IN THE SAME.

No. 281,220. Patented July 10, 1883.

WITNESSES:

INVENTOR.

(No Model.) 5 Sheets—Sheet 2.

W. HENDLEY.
VENTILATING CONDUITS FOR ELECTRIC WIRES AND ADJUSTING THE WIRES IN THE SAME.

No. 281,220. Patented July 10, 1883.

WITNESSES:

INVENTOR.

(No Model.) 5 Sheets—Sheet 4.

W. HENDLEY.
VENTILATING CONDUITS FOR ELECTRIC WIRES AND ADJUSTING THE WIRES IN THE SAME.

No. 281,220. Patented July 10, 1883.

WITNESSES:

INVENTOR, (No Model.)  5 Sheets—Sheet 5.
W. HENDLEY.
VENTILATING CONDUITS FOR ELECTRIC WIRES AND ADJUSTING THE WIRES IN THE SAME.
No. 281,220.  Patented July 10, 1883.
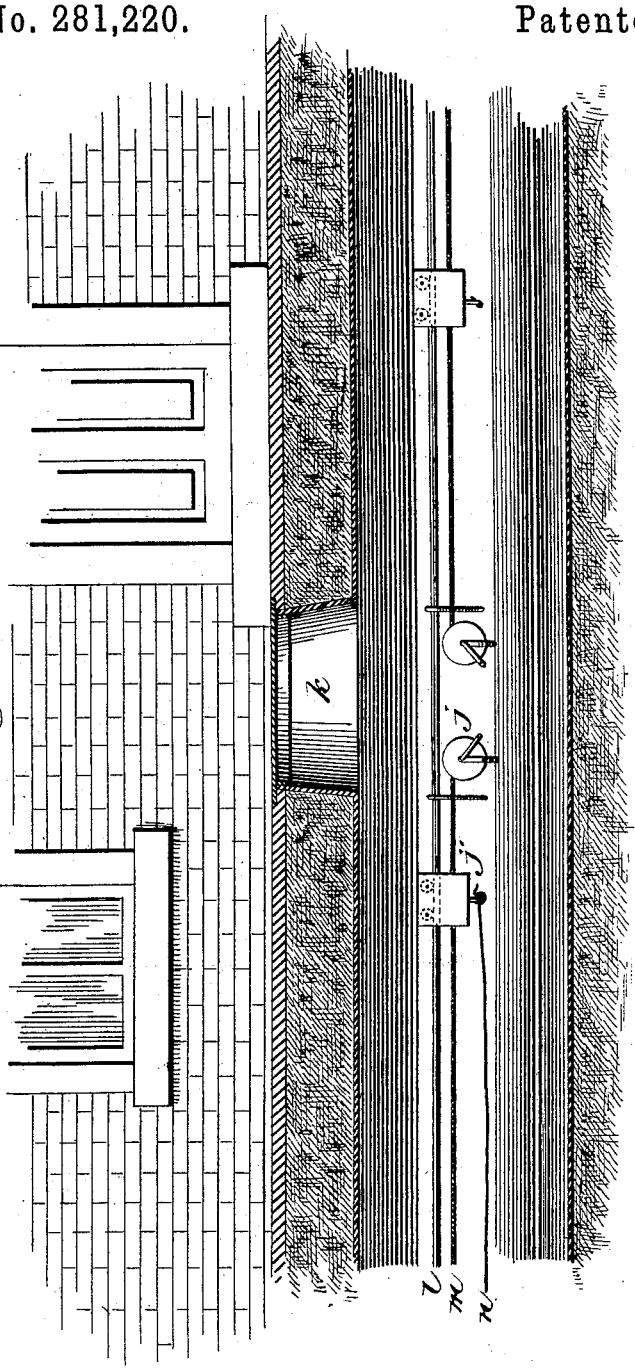
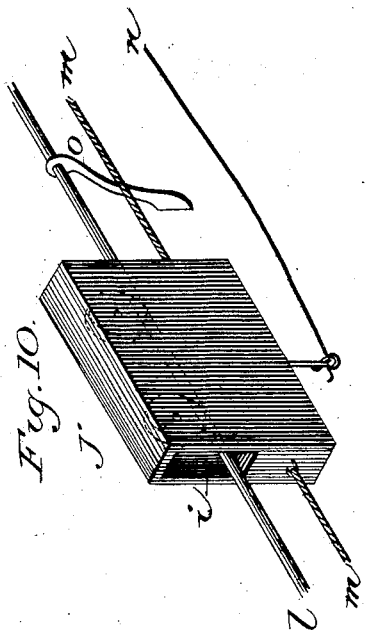
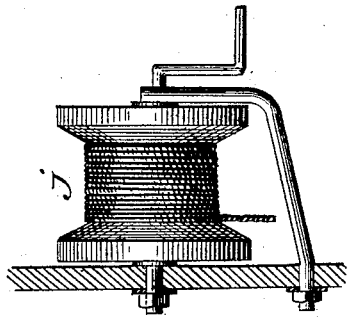
WITNESSES:  INVENTOR.

UNITED STATES PATENT OFFICE.

WILLIAM HENDLEY, OF WASHINGTON, DISTRICT OF COLUMBIA, ASSIGNOR TO GEORGE P. GOFF, OF SAME PLACE.

VENTILATING CONDUITS FOR ELECTRIC WIRES AND ADJUSTING THE WIRES IN THE SAME.

SPECIFICATION forming part of Letters Patent No. 281,220, dated July 10, 1883.

Application filed April 30, 1883. (No model.)

*To all whom it may concern:*

Be it known that I, WILLIAM HENDLEY, a citizen of the United States, residing at Washington, in the District of Columbia, have invented certain new and useful Improvements in Ventilating Conduits for Telegraph and other Wires and for Adjusting the Wires in the Same; and I do hereby declare the following to be a full, clear, and exact description of the invention, such as will enable others skilled in the art to which it appertains to make and use the same.

The object of my invention is to provide means for securing rapid and thorough ventilation and drainage for conduits for telegraph and other wires, for the arrangement of the wires on intersecting lines, and for tightening and adjusting them by means of suitable appliances located in a test-chamber, and also for means for laying the wires, and for repairing them or removing them from any part of the conduit, all of which will be more fully hereinafter described.

Figure 1:
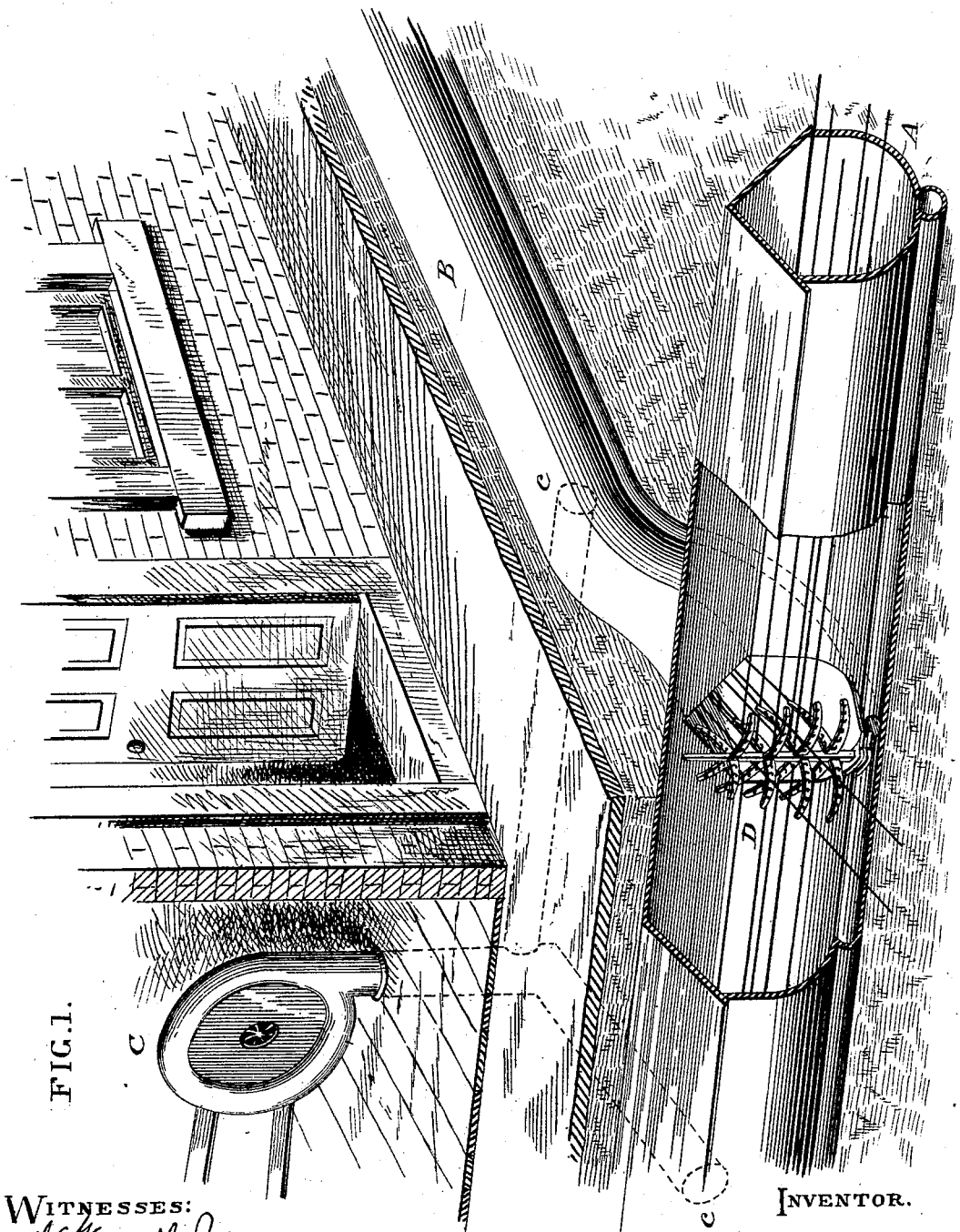
Figure 2:
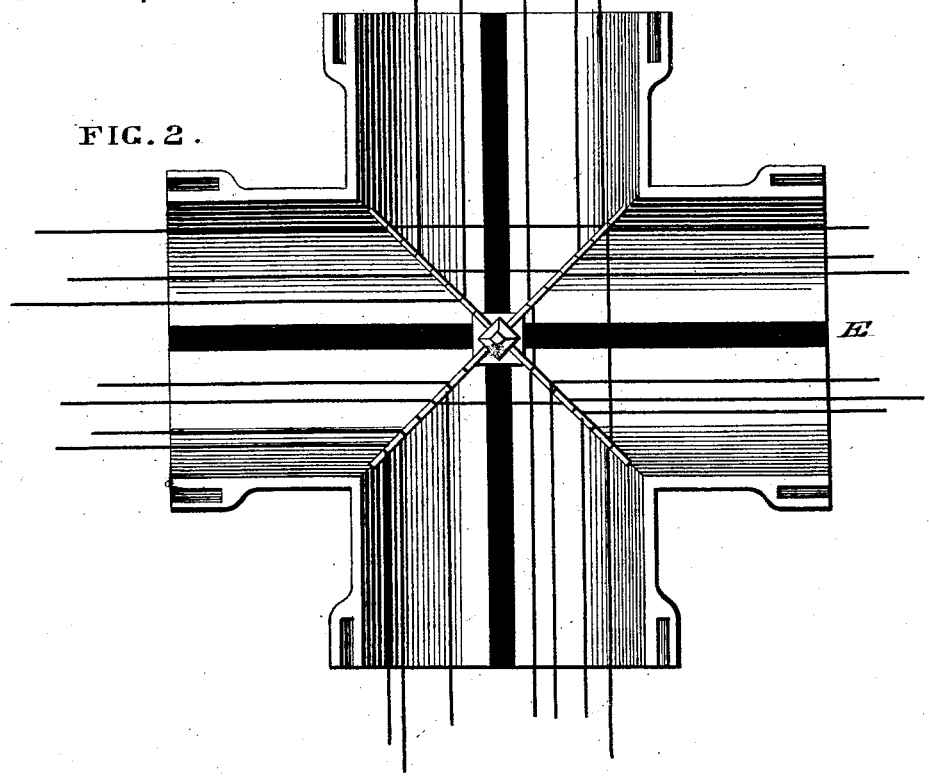
Figure 3:
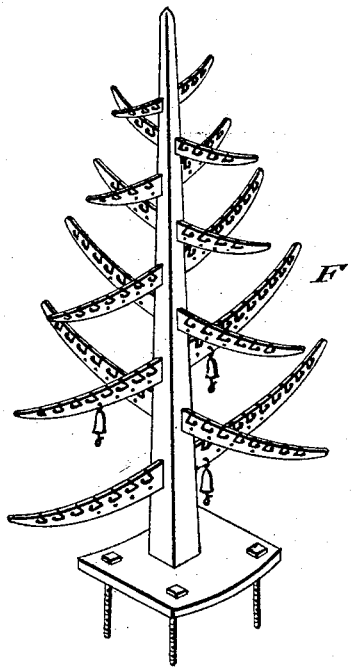
Figure 4:
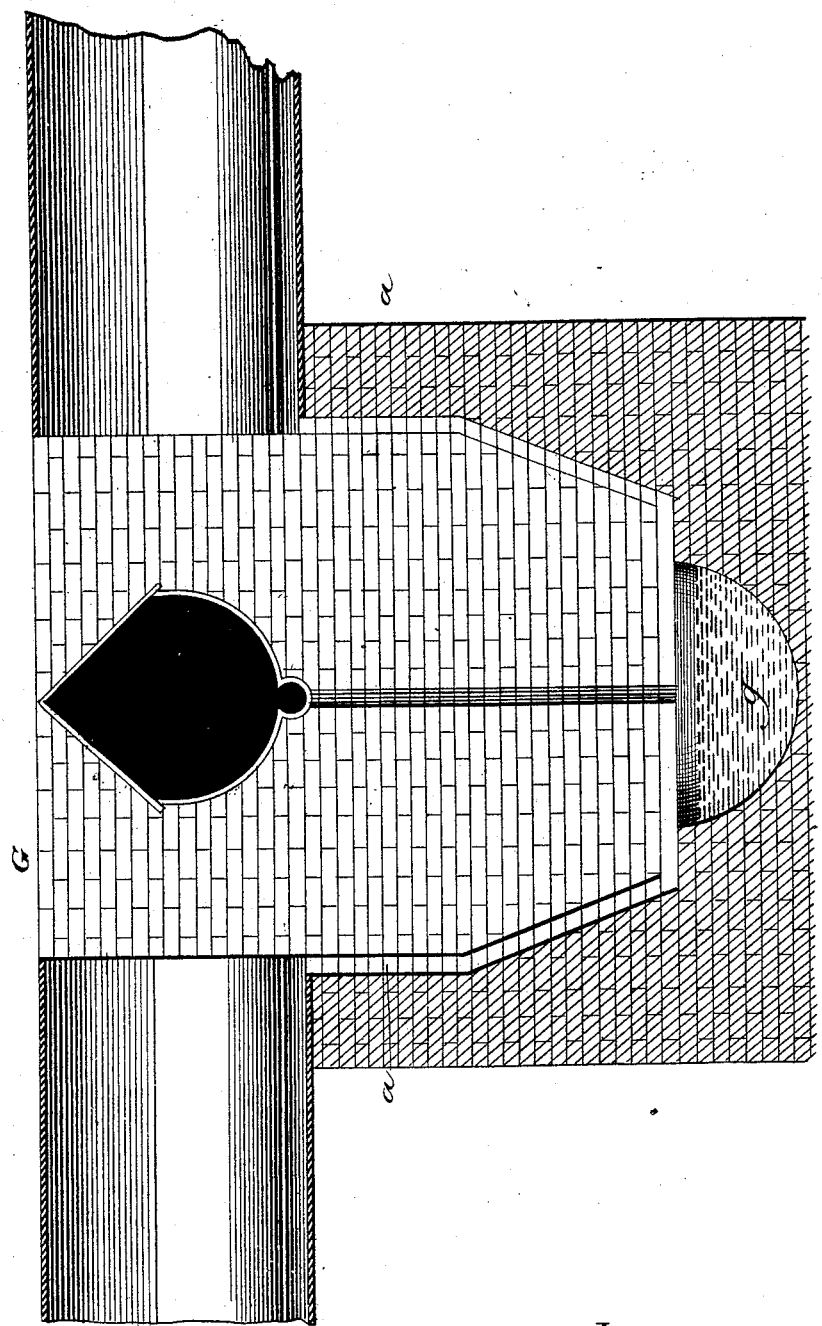
Figure 5:
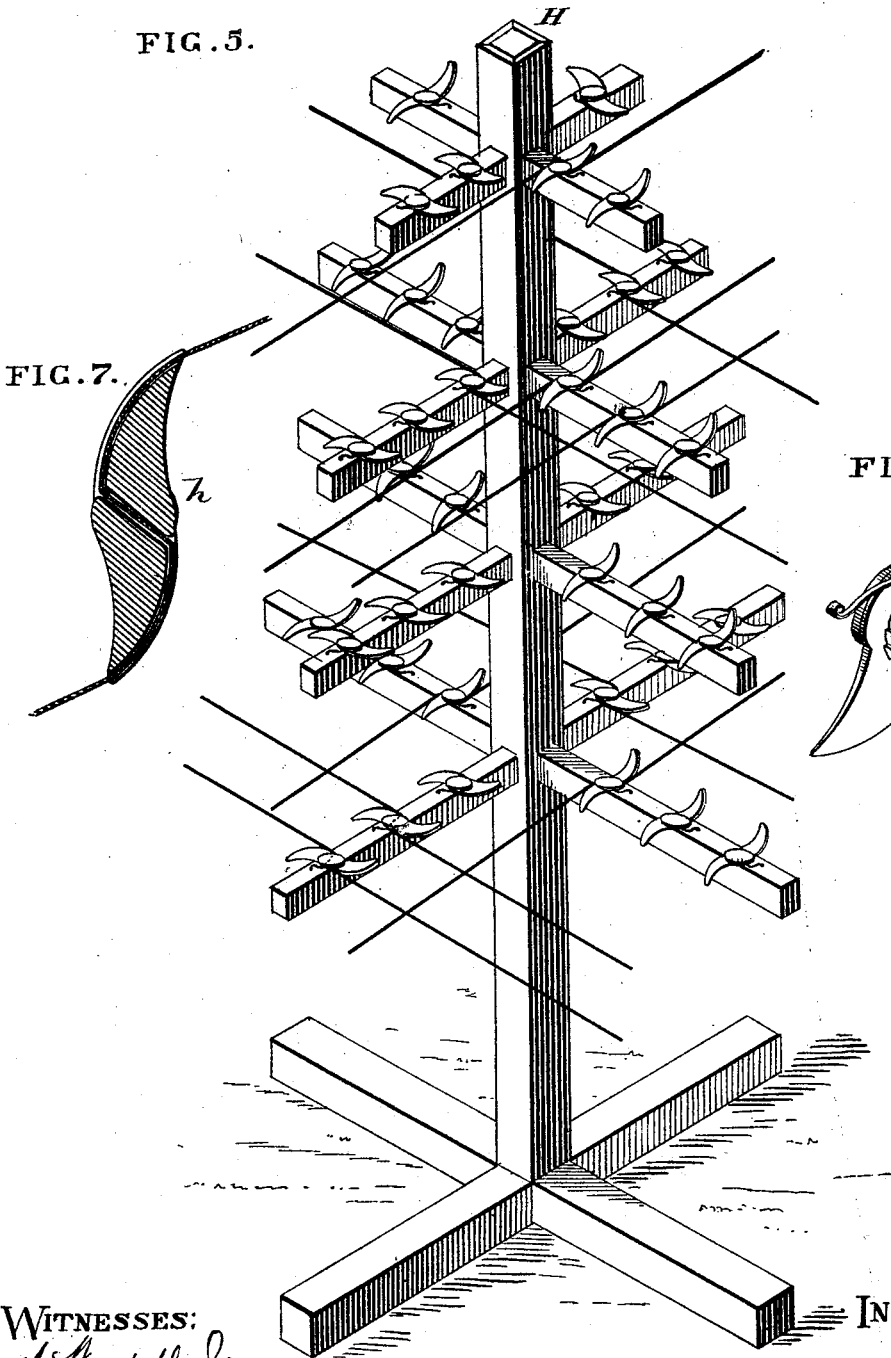
Figure 7:
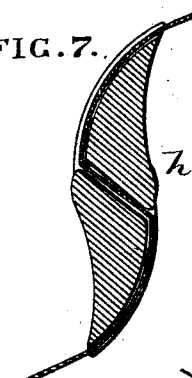
Figure 6:
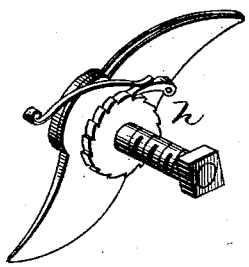

Figure 1 in the accompanying drawings is a perspective view of the conduit, showing a fan-blower with inlet-pipes and intersecting lines of the conduit. Fig. 2 is a plan view of an intersection with the cover removed. Fig. 3 shows the support for hanging the wires at an intersection. Fig. 4 is a vertical cross-section of a testing-chamber, showing the drain-pipes leading into the basin in the bottom thereof. Fig. 5 shows the means for tightening the wires by means of cams, and Figs. 6 and 7 are detail views of the cams. Fig. 8 is a longitudinal elevation of my conduit, showing the means for laying new wires or replacing old ones.

In the specification the same letters indicate corresponding parts.

In Fig. 1, A is a part of my improved conduit, as set forth in my application of November 9, 1882, Serial No. 76,350, with the smaller section, B, which is to be used on streets in which few wires are required.

C is a fan-blower for forcing currents of hot or cold dry air through the conduit, and which is to be used in conjunction with suitable outlets or pipes, which may extend into the upper air or into chimney-stacks or street-lamps, the heat of which is made available for the purpose of creating a vacuum in the pipes or outlets, and thereby accelerating the passage of driven currents of air through the conduit. The fan-blower may be of any suitable kind, the motive power of which may be derived from any number of convenient stationary engines along the lines of the conduit, and the blowers may be located at such points as may be deemed necessary in order to supply the requisite currents of air.

D represents the standard or wire-support, having a series of arms suitably slotted to receive the wires. The arms, as shown here and in Fig. 3, are adapted to be used when two lines of conduit intersect each other.

In Fig. 2, E represents an intersection of the conduit, and shows the manner in which the wires may be carried at right angles to their original line of direction, or may be continued in a right line without interfering with intersecting lines.

The standard F has the slotted arms placed alternately at right angles to each other, to avoid the contact of lines that may cross, and the slots for the wires are cut at an angle of about forty-five degrees, and inclining from the standard and terminating in an outward curve, the extremity of which is made round, and into this the wire rests. By passing the wire into the inclined slot and outward through the curve to the part that terminates in the enlarged circular opening it will have reached a point parallel to that at which it first entered the slot, and there it will remain until force is applied to remove it. The upper part of the arm on the inner side of each angular slot being cut away slightly, any wire that may rest upon the arm may, upon a slight movement, drop into the slot, and, being drawn upon, will find its way to the end of the curve.

G shows a section of a testing-chamber, into which several lines of the conduit may enter. In the bottom of the chamber is a basin, *g*, in which all the drainage from the several lines collects by passing through the drain-pipes *a a*, and from which it is pumped. As the conduit will not be connected with street-sewers for the purpose of draining, vermin will not find access to the interior thereof, and the destruction of the insulating material occasioned by them will be avoided. In this chamber is also placed the standard H, having straight or curved arms, upon which are located the double cams $h\ h$ for tightening the wires. This standard may be constructed as shown in this figure; but it is more desirable to have it conform to the requirements for the standard for the wire-supports, as set forth in my application of November 9, 1882—that is, having a shoe at the bottom of the standard, through which bolts or other suitable fastenings pass to secure it in the testing-chamber or in an intersection, as shown for the standard in Fig. 2 of the drawings.

The double cams $h\ h$, Figs. 6 and 7, are made with a groove or depression on the convex face, into which the wire fits, and an opening or eye is made through the cam, as shown in Fig. 7, through which the wire passes, the object being to avoid any angles being made in the wire, whereby the electric current may be diverted, and to prevent the "shearing off" of the wires in turning the cams. Each cam may be bolted to the standard-arms by means substantially as shown in Fig. 6, or may be otherwise suitably secured thereto. On the under side of the cam is placed a pawl and ratchet and a detent for locking the pawl. The cams are actuated by a bifurcated key. The use of this would be the more desirable should the moving of the cams be made from the street-surface through the man-hole. The total isolation of the conduit and all its appurtenances will free it from all vermin and all exhalations. Consequently there will be nothing to guard against, except the condensation that may take place in it. To dispose of this and make the conduit practically dry and keep it at a temperature of, say, 60° Fahrenheit, fan-blowers or other suitable devices are placed at proper intervals along the line of conduit for forcing currents of hot or cold dry air through it, and, in addition to this, suitable outlets are provided, extending into the upper air or into chimney-stacks and street-lamps, for the purpose of creating a vacuum and accelerating the passage of the air-currents. These are provided with valves or cut-offs to close them, when desired. When a blast is turned on, the current of air will pass through the conduit and force the heavier particles of moisture down the inclined sides of the conduit into the drain-pipe below, while the lighter vaporized particles will be carried through the outlets into the upper air. This result may be readily observed after a season of rain and fog, when stone walls and plate-glass are reeking with moisture, the wind suddenly springs up, the clouds are dispelled, and then the heavy drops with which the surfaces are charged trickle down, while that which remains disappears, as does the vapor from the breath upon the window-pane.

By having the conduit ventilated in the manner described insulated wires may be dispensed with, as the air-currents within the conduit and this system of ventilation and drainage will subject the wires to about the same atmospheric condition, as those above ground experience on a fair day, while a uniform temperature may be preserved the year round.

Fig. 8 represents a longitudinal elevation of the conduit, showing the means for laying new and replacing old wires. K is a hand-hole opening at any suitable point along the line. $l$ is the rod on which the traveler J' moves. $m\ m$ are the draw-lines; $n$, the wire about to be put in position; J, the reels; J', the traveler having the clamp $k$, and which may be drawn along the rod $l$ by means of the draw-lines $m\ m$ and the pulleys $i\ i$, located in the upper half of the longitudinal diameter of the traveler, and in the same plane with each other.

Figs. 9 and 10 represent the reel and traveler. The hand-holes K may be located at any suitable point along the line, and should be at or near every place where a wire-support is located, for the purpose of putting the wires in position immediately. The rods $l$ are supported on brackets, which are secured to one side of the conduit-trough in any suitable manner. They are preferably made of metal, and they should be made sufficiently rigid by being "hauled taut" to allow the traveler J' to pass freely along from end to end when the reel is turned. This feature of my invention presents an easy and convenient mode of laying the wires without tearing up the streets, and also of locating a break or defect in a wire at any point. The hand-holes K are provided with covers, which are flush with the line of the sidewalk or street.

The method of laying a wire by the herein-described instrumentalities is as follows: The cover being removed from the hand-hole from which the start is made, the opening being sufficiently large to freely admit the arm and shoulder of a man, the end of the wire is secured in the clamp $k$ by the man who has charge of the coil of wire; and upon the signal being given the man located at the hand-hole next beyond turns the crank of the reel J, which winds the line so as to draw the traveler along the rod $l$ toward him. When the traveler reaches him, the wire is detached and connected to the traveler on the opposite side of the hand-hole, thence to be drawn along in a similar manner through the next succeeding section to the man-hole by similar means, and this operation may be continued through the entire line of the conduit. It will be observed that the preponderance of the weight of the traveler J' is below the rod $l$, thus bringing the center of gravity sufficiently low to keep the traveler on the rod at all times.

I am aware that travelers are in common use for carrying wires in bridge-building and analogous purposes; and, further, that Patent No. 265,147 shows means for laying the wires by means of an endless rope passing over pulleys. I do not claim, broadly, the use of the traveler, for the reasons above stated.

I disclaim all the features shown in this application and not claimed, and shown and claimed in my application Serial No. 76,350, filed November 9, 1882, and which relate to the configuration of the conduit, the standards for the support of the wires, the coupling-joints for connecting the several sections of the conduit, and to the therein limited means for ventilating the same.

Having fully described my invention, what I claim as new, and desire to secure by Letters Patent, is—

1. The herein-described method of ventilating and drying conduits for electrical conductors, which consists in forcing currents of hot or cold dry air through said conduits in such manner that the heavier particles of moisture therein are condensed and allowed to pass out through the bottom of the conduit, while the lighter portions are forced out through exterior outlets and are aided in their exit by ascending currents of heated air intermingled therewith, substantially as described.

2. The means herein described for tightening telegraph and other wires, which consists of the double cams having their convex faces grooved to receive and retain the wires, and having an eye or opening extending through the center of the double cam, and at such an angle as to form a continuation of the grooved faces, with suitable adjusting and retaining mechanism for the same, in combination with an insulating-standard having suitable arms, substantially as described.

3. The combination, with a testing-chamber having a reservoir in the bottom thereof to receive the drainage from the drain-pipes of an underground conduit for telegraph and other wires, of an insulating-standard having arms or cross-bars for the support of double cams, with a pawl and ratchet and detent for locking the same, through the center and over the grooved faces of which double cams pass telegraph and other wires, said double cams being for tightening and adjusting the wires, substantially as described.

4. The double cam $h$, having the convex faces and an eye or opening extending through it at an angle and in continuation of said grooves, with a pawl and ratchet and a detent for locking said cam, in combination with an insulating-standard and supporting-arms, substantially as described.

5. In combination with the underground conduit for telegraph and similar wires, substantially as described, a traveler-rod supported by suitable brackets located on the inner side of the trough of the conduit, said rod being adapted to allow a traveler having two or more pulleys located in its interior, and having a clamping device for carrying wire located beneath, which traveler passes freely along said traveling rod when acted upon by lines or cords attached to the said traveler at its opposite ends, and leading to reels secured on the side of said conduit, as and for the purpose described.

6. The combination of the traveler-rod $l$, extending between and connected to the brackets O, the said brackets secured to the side of the conduit, the traveler J', moving on the rod $l$, and having the pulleys $i\ i$, and the draw-lines $m\ m$, suitably connected to each end of the traveler, and the reels J J, also secured to the sides of the trough of the conduit for the purpose of winding the draw-lines $m\ m$, and thereby moving the traveler J', and the wire-clamping device $k$, attached to said traveler to convey the wire, substantially as described.

In testimony whereof I affix my signature in presence of two witnesses.

WILLIAM HENDLEY.

Witnesses:
  A. C. RAWLINGS,
  A. WADDLE, Jr.